(12) United States Patent
Hunt et al.

(10) Patent No.: US 6,314,719 B1
(45) Date of Patent: Nov. 13, 2001

(54) IGNITION SYSTEM FOR A PROPULSION PRODUCING ENGINE

(75) Inventors: Jeffrey H. Hunt, Chatsworth, CA (US); Herbert R. Lander, Heber City, UT (US)

(73) Assignee: The Boeing Company, Seal Beach, CA (US)

( * ) Notice: Subject to any disclaimer, the term of this patent is extended or adjusted under 35 U.S.C. 154(b) by 0 days.

(21) Appl. No.: 09/471,540

(22) Filed: Dec. 23, 1999

(51) Int. Cl.[7] .................................................. F02K 9/00
(52) U.S. Cl. .................................................. 60/257
(58) Field of Search ........................ 60/257, 39.821, 60/218

(56) References Cited

U.S. PATENT DOCUMENTS

| | | | |
|---|---|---|---|
| 4,702,808 | * 10/1987 | Lemelson | 204/157.41 |
| 5,367,869 | * 11/1994 | DeFreitas | 60/39.06 |
| 5,497,612 | * 3/1996 | Few | 60/39.06 |
| 5,727,368 | * 3/1998 | Wernimont | 60/218 |
| 5,876,195 | * 3/1999 | Early | 431/11 |

* cited by examiner

Primary Examiner—Timothy S. Thorpe
Assistant Examiner—Ehud Gartenberg
(74) Attorney, Agent, or Firm—Lawrence N. Ginsberg

(57) ABSTRACT

The ignition system includes an optical source capable of producing light having physical characteristics sufficient for optically driven chemical disassociation of a hydrogen peroxide oxidizer; and, an optical delivery system for providing optical delivery of light from the optical source to a combustion chamber. The ignition system is used for a propulsion producing engine having a combustion chamber for the introduction of a fuel and a hydrogen peroxide oxidizer. The initiation of combustion is produced by the non-linear, optical interaction of the produced light with a fuel and the oxidizer present in the combustion chamber, thereby leading to molecular disassociation of the oxidizer such that there is initiation of combustion.

5 Claims, 2 Drawing Sheets

IGNITION SYSTEM FOR A PROPULSION PRODUCING ENGINE

BACKGROUND OF THE INVENTION

1. Field of the Invention

The present invention relates to ignition systems and more particularly an ignition system for a propulsion producing engine that uses optical means for initiating the exothermic chemical reaction associated with so-called green fuels.

2. Description of the Related Art

Chemical hypergolic additives have long been used to initiate exothermic chemical reactions. These "hypergols" are highly reactive and highly toxic. In order to be deemed a non-toxic fuel, a small amount of hypergol can be added to the fuel directly. In such instance, there is sufficient hypergol to allow for the initiation of the reaction. Yet, its presence in a non-toxic fuel is of sufficient dilution that the fuel still qualifies as non-toxic. In summary, the fuel is maintained in a "green" classification by adding enough hypergol to the fuel to make it self-initiating in the presence of the oxidizer, but in such small quantities that its dilution in the fuel technically qualifies the mixture as non-toxic.

However, the presence of the hypergol in the fuel means that its performance is reduced. That is, once the mixture has begun to react, the hypergol's role is no longer necessary and it becomes, in essence, a contaminant, potentially reducing the propulsion performance. In practical terms, there is no long term storage data regarding whether this fuel hypergol mixture will remain viable in the long term.

U.S. Pat. No. 4,702,808, issued to J. H. Lemelson, entitled "Chemical Reaction Apparatus and Method" discloses rocket engine ignition in which propellants are ignited by an intense radiant energy, such as a light beam generated by a laser mounted in a housing. A beam of intense light is directed to the interior volume and caused to intersect fuel fed through inlets to effect ignition. There is no discussion in this patent of the photo-chemical interaction of the oxidizer and the fuel.

U.S. Pat. No. 5,727,368, issued to E. J. Wernimont, entitled "Hybrid Motor System with a Consumable Catalytic Bed a Composition of the Catalytic Bed and a Method of Using", discloses a method, device, and composition for achieving ignition and sustained combustion using a solid consumable catalytic bed. The consumable catalytic bed (CCB) accomplishes this by decomposition of an injected fuel. Initially, this reaction is catalytic or hypergolic in nature eventually becoming entirely thermal as the CCB is consumed in the reaction generated. The patent is directed to a hydrogen peroxide hybrid rocket.

OBJECTS AND SUMMARY OF THE INVENTION

It is therefore a principal object of the present invention to provide an ignition system for an engine, which is particularly applicable for use with a hydrogen peroxide oxidizer.

Another object is to use an optical system as a means for disassociating the oxidizer.

These and other objects are achieved by the present invention, which in its broadest aspects, includes an optical source capable of producing light having physical characteristics sufficient for optically driven chemical disassociation of a hydrogen peroxide oxidizer; and, an optical delivery system for providing optical delivery of light from the optical source to a combustion chamber. The ignition system is used for a propulsion producing engine having a combustion chamber for the introduction of a fuel and a hydrogen peroxide oxidizer. The initiation of combustion is produced by the non-linear, optical interaction of the produced light with a fuel and the oxidizer present in the combustion chamber, thereby leading to molecular disassociation of the oxidizer such that there is initiation of combustion.

The use of optically induced ignition in a rocket engine has a number of advantages over standard ignition systems. The use of hypergolic chemical additives is being gradually phased out due to the danger of handling extremely toxic liquids. Additionally, the hypergols have long delay times (>1 millisecond) in their ability to initiate combustion. Solid state pyrotechnics work well, but can only be used once, prohibiting their use in circumstances where a re-light may be necessary. The standard source for most engines is an electrical discharge. The device which produces the requisite energetic discharge is large, heavy and must be located within the reaction chamber making remote operation impossible. Additionally, the discharge requires that the chemicals be in a fuel rich mixture to start the reaction. The resulting transient produces a huge shock acoustic shock wave. Engines must be built to specifications, not to survive steady state operation, but to survive the start transient. Optical ignition can start at almost any mixture ratio, offering the ability to reduce or eliminate the start transient. This leads to lighter weight engines.

These and other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
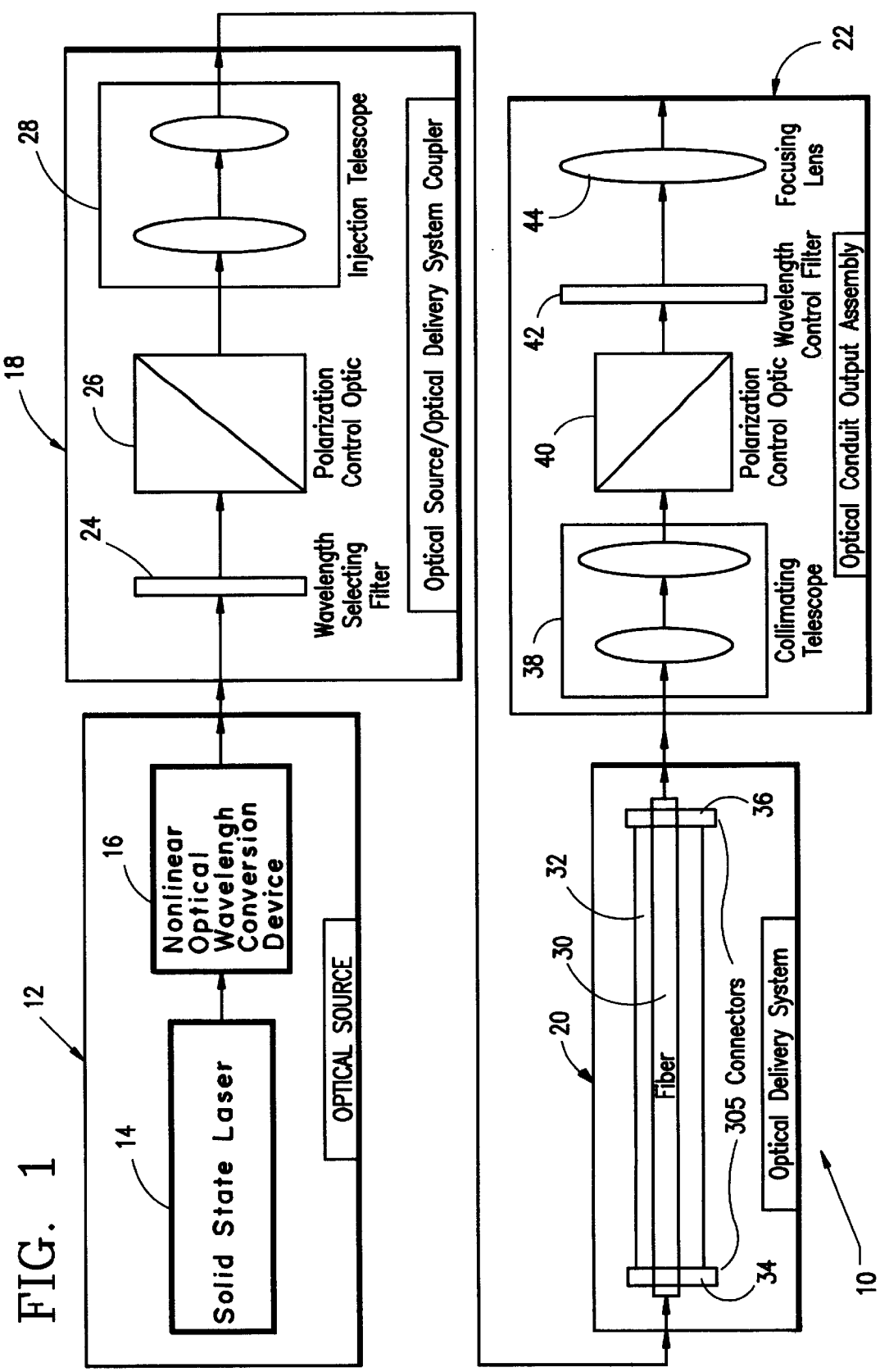
FIG. 1 is a schematic illustration of the ignition system for a propulsion producing engine of the present invention.

Referring now to the drawings and the characters of reference marked thereon, FIG. 1 illustrates the ignition system of the present invention, designated generally as 10. The ignition system 10 includes a remotely located optical source, designated generally as 12. The optical source 12 includes a laser 14 for generating output light having an intensity of sufficient quantity to initiate chemical disassociation of a hydrogen peroxide oxidizer. The laser 14 is preferably a diode pumped solid-state system. It preferably includes a Nd:YAG lasing medium with an internal Q-switch for the generation of high peak intensity pulses with an output wavelength of 1.064 microns. However, other solid-state lasing media may be employable in place of Nd:YAG.

The use of hydrogen peroxide is very desirable because its chemical properties include storability, chemical longevity, non-toxicity and ability for use with an optical initiator, as will be discussed in detail below.

A wavelength conversion device 16 is operably associated with the laser 14 for changing the laser output light from an original output wavelength to a shorter wavelength which is optimized for the disassociation of the oxidizer.

The wavelength conversion device 16 includes a nonlinear optical crystal capable of providing phased matched generation of second harmonic, third harmonic and fourth harmonic of the input wavelength at 1.064 microns, assuming a Nd:YAG lasing medium is used.

An optical delivery system, designated generally by numeral designations 18, 20 and 22 provide optical delivery of light from the optical source 12 to a combustion chamber. The optical delivery system includes an optical source/optical delivery system coupler 18 connected, at a first end, to the optical source 12. An optical conduit 20 has a first end connected to a second end of the optical source/optical delivery system coupler 18. An optical conduit output assembly 22 is connected to a second end of the optical conduit 20 to capture the delivered light as it exits the optical conduit 20 and conditions the light in preparation for introduction into the combustion chamber.

The optical source/optical delivery system coupler 18 includes an input wavelength selecting filter 24 for receiving light from the optical source 12. The input wavelength selecting filter 24 is an optical element which allows, by an optical process, the transmission of the desired wavelength and does not transmit light of unwanted wavelengths. Such filters 24 are commercially available. An input polarization control optic 26 receives light exiting the input wavelength selecting filter 24. The polarization control optic 26 transmits lights of desired polarization and does not transmit light in undesirable polarizations.

An injection telescope 28 receives light exiting the input polarization control optic 26 and delivers the light to the optical conduit 20. The optical elements in the telescope 28 condition the laser light for entry into the optical fiber. This conditioning includes absolute beam spot size, as well as degree of collimation and angle of convergence into the fiber. Although the telescope is shown with two optical elements it may be necessary to use three elements in order to get needed optical injection characteristics in order to avoid loss of optical energy. The telescope 28 optical elements include AR (anti-reflection) coatings on all interior and exterior surfaces.

The optical conduit 20 includes an optical fiber 30 having a first end and a second end. A fiber cover 32 surrounds the optical fiber 30. A first optical fiber connector 34 is secured to the first end of the optical fiber 30. A second optical fiber connector 36 is secured to the second end of the optical fiber 30. Thus, the first optical fiber connector 34 is attached to the optical source/optical delivery coupler 18 while the second optical fiber connector 26 attaches to the optical conduit output assembly 22.

The optical fiber 30 must be capable of propagating the optical light at appropriate energy, intensity and wavelength. Thus, the optical fiber material has a high-damage threshold so that the light does not damage it. The optical fiber 30 material is optically hard and of sufficiently large diameter to propagate the light without damage. Such an optical fiber 30 is commercially available. An example of such a fiber is that manufactured by 3M Specialty Optical Fibers. It is specified as a coated silica/silica fiber under the FG series.

The optical conduit assembly 22 includes a collimating telescope 38 for receiving light as it exits the second end of the optical conduit 20. The collimating telescope 38 has optical characteristics which provide the capability of capturing the light as it exits the optical fiber 30. It collimates the light for transmission through the subsequent elements of the optical conduit output assembly 22. As with the injection telescope 28 there may be more than two elements. These elements are preferably anti-reflection coated.

An output polarization control optic for 40 receives light exiting the collimating optical telescope 38. Its characteristics are the same as discussed above with respect to polarization control optic 26. An output wavelength selecting filter 42 receives light exiting the output polarization control optic 40. Its characteristics are the same as the input wavelength selecting filter 24. A focusing lens 44 receives light from the output wavelength selecting filter 42 and introduces the light into a combustion chamber.

The focusing lens 44 has optical properties so that, at its focus point, the intensity of the light is sufficiently high to provide the non-linear optical interaction leading to the oxidizer disassociation. Additionally, its location within the chamber must be in a location where both the oxidizer and fuel are present in sufficient amounts to chemically react.

Figure 2:
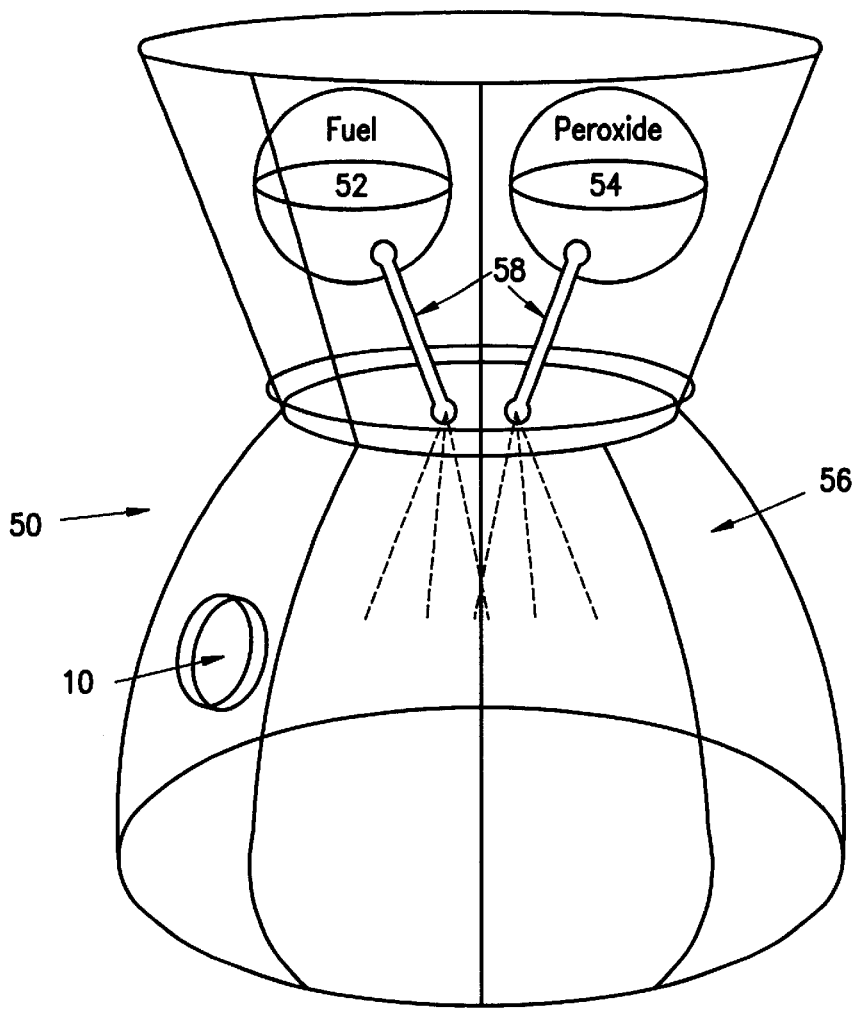
FIG. 2 is a schematic illustration of a self-oxidizing propulsion producing engine of the present invention.

Referring now to FIG. 2, a self-oxidizing propulsion producing engine utilizing the ignition system 10 is illustrated, the engine being designated generally as 50. The engine 50 includes a fuel source 52 for supplying fuel capable of reacting exothermically with the hydrogen peroxide oxidizer. An oxidizer source 54 supplies the hydrogen peroxide oxidizer. A combustion chamber 56 is provided. Additionally, means 58 are provided for introducing the fuel and the oxidizer into the combustion chamber 56.

There are constraints on the material to be used in the window. The window material must be transmissive to ultraviolet light. It must have mechanical properties, such that it can withstand the acoustic shocks. It must be able to handle heating associated with operation in an engine environment. The preferred material will be sapphire. Sapphire has good ultraviolet transmission properties. It may have an anti-reflection coating for ideal UV operation. Sapphire is very hard mechanically and able to handle the thermal changes associated with use in an engine environment. Additionally, the window may need to be kept clean during firing to allow for re-lights. In that circumstance, a gas "curtain" will be flowed across the interior surface of the window to minimize the amount of contaminant that may deposit there.

Figure 3:
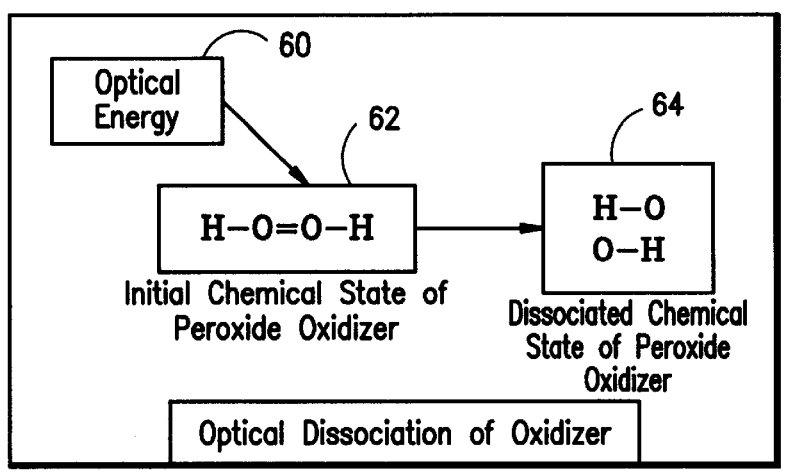
FIG. 3 is a chemical schematic illustration showing the interaction of light with the oxidizer leading to an optically disassociated state thereof.

Referring now to FIG. 3, the interaction light 60 with the hydrogen oxidizer is shown leading to an optically disassociated state of the hydrogen peroxide. It is shown in its initial chemical configuration in the box designated 62 and in the disassociated chemical configuration in the box designated 64. The absorption of the optical energy breaks the molecule in to hydroxyl radicals, which, in sufficient density can initiate the chemical reaction with the fuel.

The process for this is fairly complex. The light has been shifted to a short wavelength in the ultraviolet regime of the spectrum. However, it is still not short enough for direct absorption by peroxide. The absorption occurs via a non-linear optical absorption. In this situation, the light intensity has been made sufficiently high (by a combination of using short pulses and focusing the light to a small spot in the ignition regime) that the oxidizer can absorb light at a harmonic of its wavelength. Specifically, light at wavelength $\lambda$ in the chamber will be absorbed as if its wavelength is $\frac{1}{2}\lambda$. This can always occur in a medium if the light intensity is high enough.

Chemically, peroxide is formed of two hydroxyl radicals (oxygen atom bound to a hydrogen atom) that are double-bonded to each other. The nature of the double bond is such that its non-linearity is much larger than that connecting the oxygen to the hydrogen. The importance here is that the double bond will receive most of the energy associated with the non-linear absorption. As a result, when the molecule breaks apart (disassociates), the break will occur at the double bond connecting the two oxygen atoms, resulting in free hydroxyl radicals. These radicals can then attack the fuel molecules and react with them. If the density of reactants is large enough, the release of the energy associated with the reaction will be enough to sustain the continuation of the reaction. The equation governing the optical intensity to drive the optical breakdown is given by:

$$I_{cr} = \{[mcE_f(1+(\omega\tau)^2)]/[2\pi e^2\tau]\}[g+1/\tau_p \log_e(\rho_{cr}/\rho_o)].$$

Where $\rho_{cr}$ is the critical electron number for breakdown; $\tau_p$ is the laser pulsewidth; m,e,c are the electron constants; $\omega$ is the optical field frequency; $E_f$ is the ionization energy of the fuel or oxidizer; $\tau$ is the momentum transfer collision time; g is the electron loss rate; and $\rho_o$ is the "initial" electron density. Optical systems can be designed which can deliver this level of intensity into the combustion chamber.

As noted above, hydrogen peroxide is non-toxic. A non-toxic oxidizer will, up to a certain level of exposure, have little effect on a living organism. Since hydrogen peroxide is a liquid there is a potential for an effect on people handling it. Therefore, its relative non-toxicity is a very desirable characteristic.

Obviously, many modifications and variations of the present invention are possible in light of the above teachings. It is, therefore, to be understood that, within the scope of the appended claims, the invention may be practiced otherwise than as specifically described.

What is claimed and desired to be secured by Letters Patent of the United States is:

1. A propulsion engine system having a combustion chamber combusting a fuel and a hydrogen peroxide oxidizer, including an ignition device comprising:
   a) an optical source producing light having physical characteristics sufficient to optically drive chemical dissociation of a hydrogen peroxide oxidizer, said source being a laser and a wavelength conversion device operably associated with said laser for changing the laser output light from an original output wavelength to a shorter wavelength which is optimized for the dissociation of the oxidizer;
   b) an optical delivery system comprising an input wavelength selecting filter providing optical delivery of light from said optical source to said combustion chamber, wherein
      initiation of combustion is produced by a non-linear, optical interaction of said produced light with the fuel and the hydrogen peroxide oxidizer present in the combustion chamber, thereby leading to molecular dissociation of the hydrogen peroxide oxidizer such that there is initiation of combustion.

2. The engine system of claim 1, wherein said optical delivery system, comprises:
   a) an optical source/optical delivery system coupler connected, at a first end, to said optical source;
   b) an optical conduit having a first end connected to a second end of said optical source/optical delivery system coupler; and
   c) an optical conduit output assembly connected to a second end of said optical conduit to capture the delivered light as it exits the optical conduit and conditions it in preparation for introduction into the combustion chamber.

3. The engine system of claim 2, wherein said optical source/optical delivery system coupler, comprises:
   a) the input wavelength selecting filter of claim 1 for receiving light from the optical source;
   b) an input polarization control optic for receiving light exiting said input wavelength selecting filter; and
   c) an injection telescope for receiving light exiting said input polarization control optic and delivering the light to said optical conduit.

4. The engine system of claim 2, wherein said optical conduit output assembly, comprises:
   a) a collimating telescope for receiving light as it exits the second end of said optical conduit;
   b) an output polarization control optic for receiving light exiting said collimating telescope;
   c) an output wavelength selecting filter for receiving light exiting said output polarization control optic; and
   d) a focusing lens for receiving light from said output wavelength selecting filter and introducing light into the combustion chamber.

5. The engine system of claim 2, wherein said optical conduit, comprises:
   a) an optical fiber having a first end and a second end;
   b) a fiber cover surrounding said optical fiber;
   c) a first optical fiber connector secured to the first end of said optical fiber; and
   d) a second optical fiber connector secured to the second end of said optical fiber,
      wherein said first optical fiber connector is attached to said optical source/optical delivery system coupler and said second optical fiber connector is attached to said optical conduit output assembly.

* * * * *